United States Patent [19]

Chang

[11] Patent Number: 4,711,005

[45] Date of Patent: Dec. 8, 1987

[54] METHOD AND APPARATUS FOR MAKING SLATS FOR WINDOW BLINDS AND THE LIKE FROM A CONTINUOUS WEB OF PLASTIC MATERIAL

[75] Inventor: A-Shen Chang, Changhua Hsien, Taiwan

[73] Assignee: Joanna Western Mills Company, Chicago, Ill.

[21] Appl. No.: 884,991

[22] Filed: Jul. 14, 1986

Related U.S. Application Data

[63] Continuation-in-part of Ser. No. 775,262, Sep. 12, 1985, Pat. No. 4,615,087.

[51] Int. Cl.⁴ ........................ B23P 19/04; B23P 23/00; B29C 43/22

[52] U.S. Cl. .................................... 29/24.5; 29/564.6; 29/564.8; 29/700; 264/151; 264/156; 264/160; 264/322; 264/DIG. 46; 425/384; 428/98; 428/174

[58] Field of Search ................... 29/24.5, 564.6, 564.8, 29/819, 700, 779, 782; 264/151, 156, 160, 322, DIG. 46; 425/384; 428/98, 174, 542.8

[56] References Cited

U.S. PATENT DOCUMENTS

| | | | |
|---|---|---|---|
| 4,034,205 | 7/1977 | Reichel | 425/384 X |
| 4,073,044 | 2/1978 | Edixhoven | 29/24.5 |
| 4,140,457 | 2/1979 | Miki et al. | 425/384 |
| 4,306,856 | 12/1981 | Arippol | 425/384 X |
| 4,420,862 | 12/1983 | Edixhoven | 29/24.5 |
| 4,450,701 | 5/1984 | Treiber et al. | 29/24.5 |
| 4,475,881 | 10/1984 | Borst et al. | 425/384 X |
| 4,485,059 | 11/1984 | Krutchen et al. | 425/384 X |
| 4,516,300 | 5/1985 | Gaillard et al. | 29/24.5 |

FOREIGN PATENT DOCUMENTS

| | | | |
|---|---|---|---|
| 8504687 | 10/1985 | World Int. Prop. O. | 29/24.5 |

*Primary Examiner*—Howard N. Goldberg
*Assistant Examiner*—Ronald S. Wallace
*Attorney, Agent, or Firm*—Mason, Kolehmainen, Rathburn & Wyss

[57] ABSTRACT

A new and improved method of forming slats for window blinds and the like from a continuous web of plastic material includes a feeder for directing the web longitudinally from a roll at a selected speed rate into a heating chamber including upper and lower plates defining a longitudinally extending heating path between opposite inlet and outlet ends. As the web moves along the path, opposite surfaces thereof are heated to an elevated temperature and the web material then moves into a molding and cooling chamber immediately adjacent the exit end of the heating chamber wherein the web is molded to provide a curved transverse cross-section while the web is cooled. The web is cooled to a temperature at a level selected to provide a permanent set in the longitudinally traveling web. Exit feed rolls are provided adjacent the exit end of the molding and cooling chamber to direct the curved web longitudinally toward a cutting and punching section for cutting the web material into slats of discrete length and punching openings therein ready for receiving flexible support ladders in a final assembly section to form finished window blinds.

20 Claims, 11 Drawing Figures

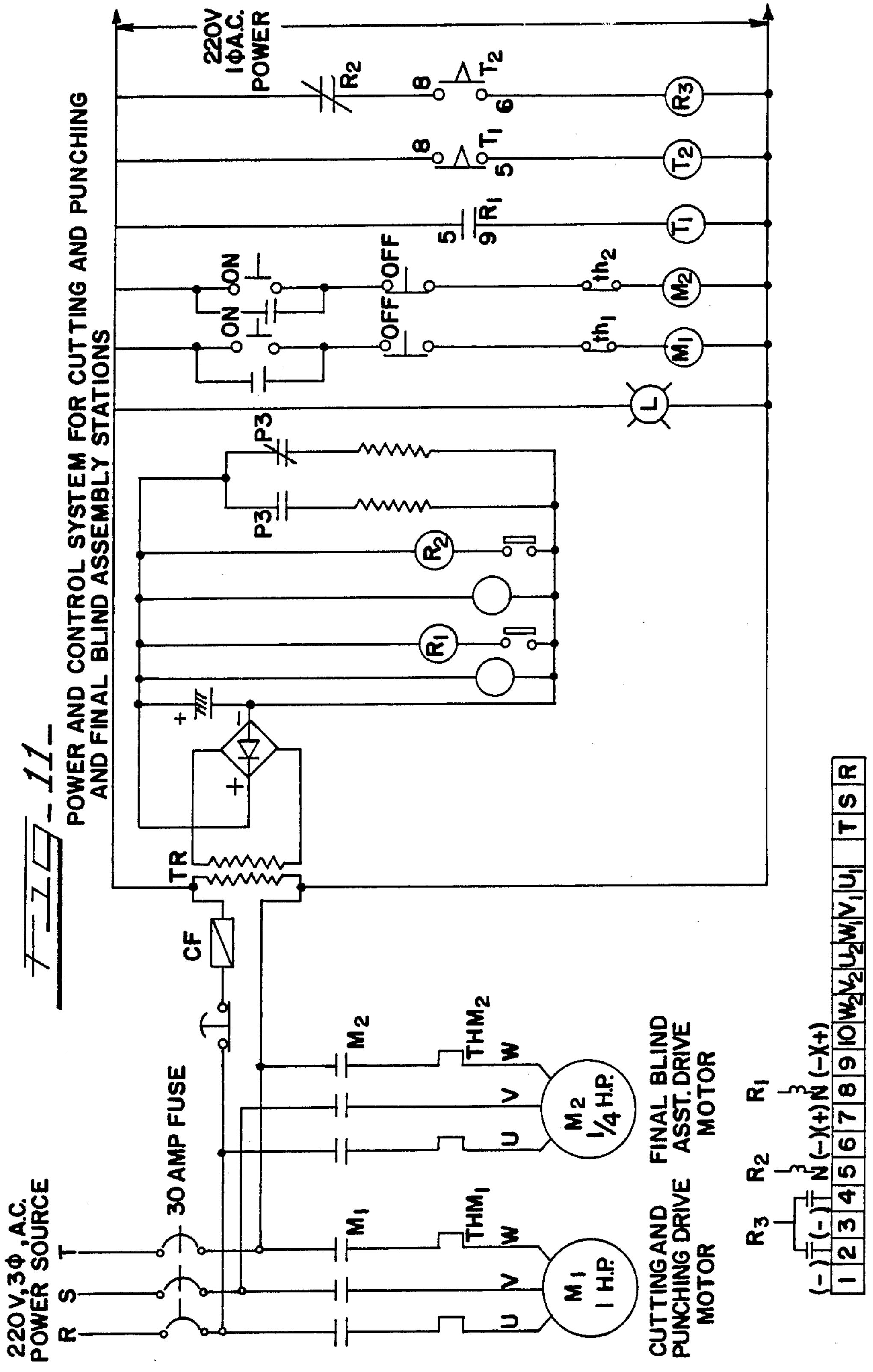
FIG. 11 POWER AND CONTROL SYSTEM FOR CUTTING AND PUNCHING AND FINAL BLIND ASSEMBLY STATIONS

METHOD AND APPARATUS FOR MAKING SLATS FOR WINDOW BLINDS AND THE LIKE FROM A CONTINUOUS WEB OF PLASTIC MATERIAL

RELATED APPLICATION

This application is a continuation-in-part of copending U.S. patent application Ser. No. 775,262, filed Sept. 12, 1985, for CONTINUOUS MECHANISM FOR REMOLDING, LENGTH-SETTING AND ASSEMBLING BLIND'S PLASTIC STRIPS, now U.S. Pat. No. 4,615,087 issued Oct. 7, 1986.

BACKGROUND OF THE INVENTION

1. Field of the Invention

This invention relates to a new and improved method and apparatus for making slats for window blinds and the like from a continuous web of plastic material such as PVC (polyvinylchloride).

2. Background of the Prior Art

The following United States patents listed hereinafter relate to methods and apparatus for making venetian blinds and components thereof.

| U.S. PAT. NO. | INVENTOR(S) |
|---|---|
| 2,827,686 | Adelman |
| 2,917,810 | Wilson |
| 3,292,232 | Nilsson |
| 3,710,464 | Persson |
| 3,766,815 | Edixhoven |
| 4,073,044 | Edixhoven |
| 4,420,862 | Edixhoven |
| 4,450,701 | Treibor et al |
| 4,516,300 | Gaillard et al |
| 4,545,100 | Gaillard et al |

The Treibor et al patent discloses a method of forming slats for venetian blinds from an elongated metallic strip having a baked enamel surface thereon.

OBJECTS OF THE PRESENT INVENTION

It is an object of the present invention to provide a new and improved method and apparatus for making elongated slats for window blinds and the like from a continuous web of plastic material.

More particularly, it is an object of the present invention to provide a new and improved method and apparatus for making slats for window blinds and the like from a continuous web of plastic material such as polyvinylchloride.

Yet another object of the present invention is to provide a new and improved method and apparatus for making slats for window blinds and the like of the character described wherein the slats are formed with a permanent, curved, transverse cross-section to provide a degree of rigidity as needed.

Another object of the present invention is to provide a new and improved method and apparatus of the character described which is capable of rapidly producing high quality blind slats without requiring manual labor or at least only a minimal amount thereof.

It is another object of the present invention to provide a new and improved method and apparatus of the character described which provides elongated slats of plastic material for window blinds and the like on an extremely economical basis and exceptionally suitable for use in a wide variety of horizontal and vertical blinds for controlling the passage of light through windows and doors of buildings and structures.

BRIEF SUMMARY OF THE INVENTION

The foregoing and other objects and advantages of the present invention are accomplished in a new and improved apparatus and method for making slats for window blinds and the like from a continuous web of plastic material such as PVC (polyvinylchloride). The web of plastic material is fed from a roll at a selected feed rate into an elongated, heating chamber which has upper and lower plates defining a longitudinal path for the traveling web between inlet and exit ends of the chamber. The plates are heated to a desired temperature and are formed with opposite matching grooves for contact with opposite sides of the traveling web as it moves through the heating chamber. Immediately after leaving the exit end of the heating chamber, the continuous web moves into an elongated molding and cooling chamber having upper and lower cooling dies which confront opposite sides of the web to permanently mold and set the moving web into the desired curved transverse cross-section as the web is cooled to a permanent setting temperature. The cooled and set continuous web passes through an exit end of the molding and cooling chamber and is directed longitudinally into a cutting and punching section wherein the continuous web is severed into slats of discrete length with openings punched out ready for final assembly to receive flexible support elements or ladders used to assemble the slats into window and door blinds and the like.

BRIEF DESCRIPTION OF THE DRAWINGS

For a better understanding of the present invention, reference should be had to the following detailed description taken in conjunction with the drawings, in which:

FIG. 11 is a schematic electrical diagram of a power and control system for a cutting and punching section and a final assembly section of the apparatus.

DETAILED DESCRIPTION OF A PREFERRED EMBODIMENT

Figure 1:
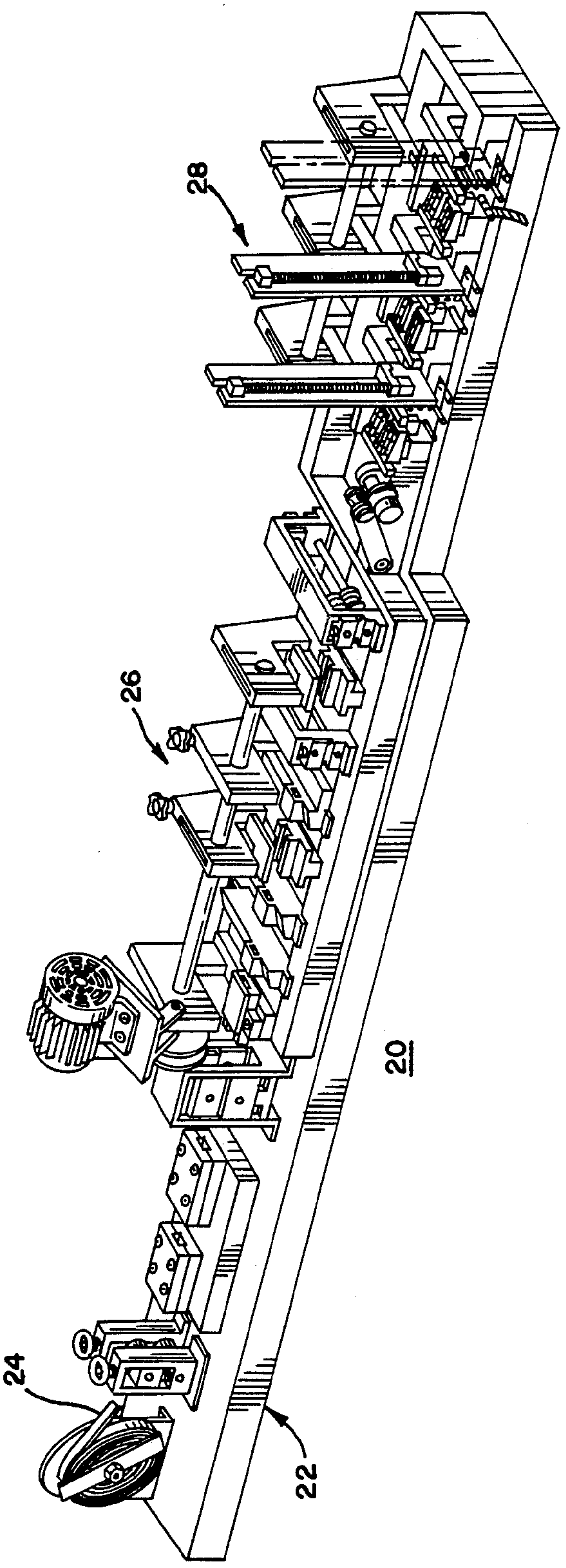
FIG. 1 is an elevational perspective view of a new and improved apparatus for making slats for window blinds and the like from a continuous web of plastic material and constructed in accordance with the features of the present invention.
Figure 6:
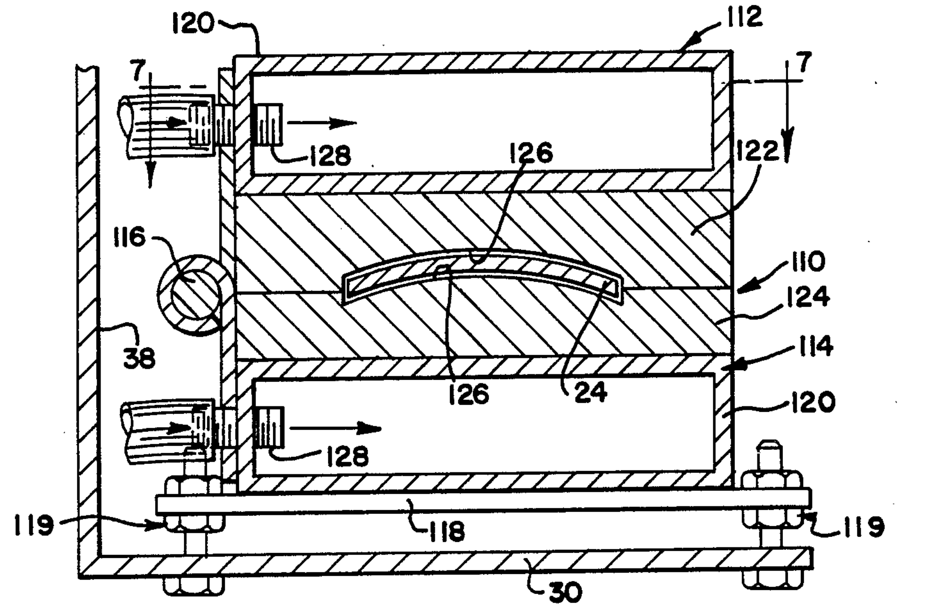
FIG. 6 is a transverse cross-sectional view taken substantially along lines 6—6 of FIG. 3.

Referring now more particularly to the drawings, in FIG. 1 is illustrated a new and improved apparatus for making slats for window blinds and the like from a continuous webbing or web of plastic material such as PVC. The apparatus is referred to generally by the reference numeral 20 and includes a first section 22 for molding and forming a continuous web or strip of flat PVC material 24 into a shape as shown in FIG. 6 wherein the strip has a permanently set, transverse cross-section with a curvature as illustrated. After the strip of PVC plastic material 24 is molded into a curved cross-section in a molding or forming section 22, the strip moves into a second, cutting and punching section 26 wherein the continuous web is sheared into discrete slats of selected length and holes or slots at proper intervals are punched therein in readiness for final assembly of the slats into blinds. Assembly of the slats into finished blinds occurs in a third, final assembly section 28 wherein cords of flexible material forming flexible support ladders are interengaged with the slats as more fully described in the aforementioned copending U.S. patent application, the disclosure of which is hereby incorporated by reference in the present specification.

Referring to FIGS. 2 through 8 in greater detail, the molding and forming section 22 includes a table or base structure 30 supported at an appropriate working level above the floor on a pedestal or support structure 32. At the left hand end as viewed in FIGS. 2 and 3, the molding and forming section 22 is provided with an upstanding control cabinet 34 having a control panel 36 on the front face to enable an operator to control the operations and maintain a constant surveillance of the operating parameters. The table or base structure 30 also includes an upstanding enclosure 38 for housing mechanical drive components of the system to be described in more detail hereinafter.

Figure 2:
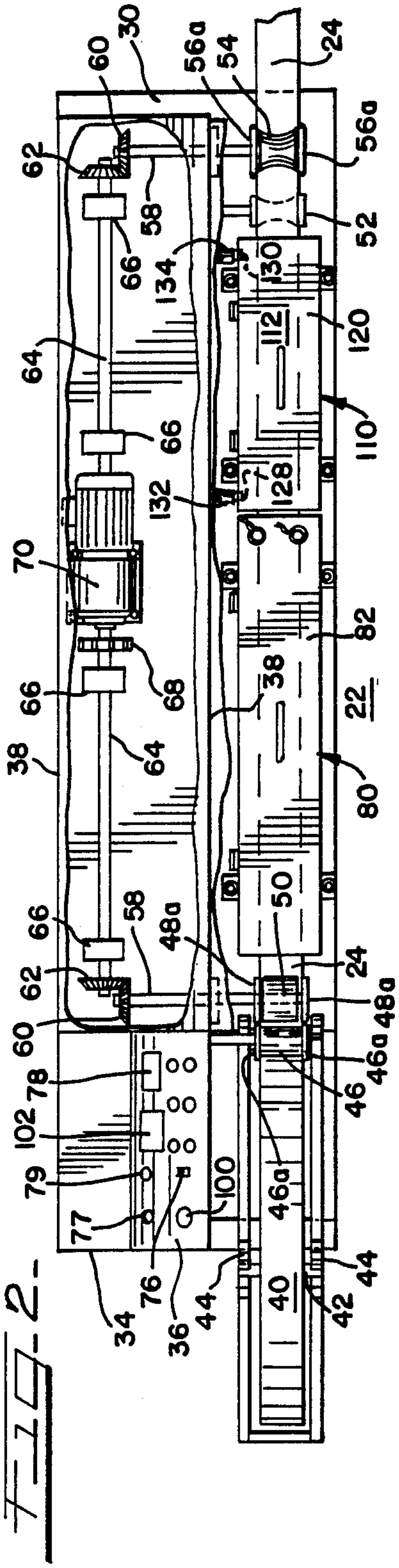
FIG. 2 is an enlarged, fragmentary top plan view with portions cut-away showing a web forming section of the apparatus of FIG. 1 in greater detail.
Figure 3:
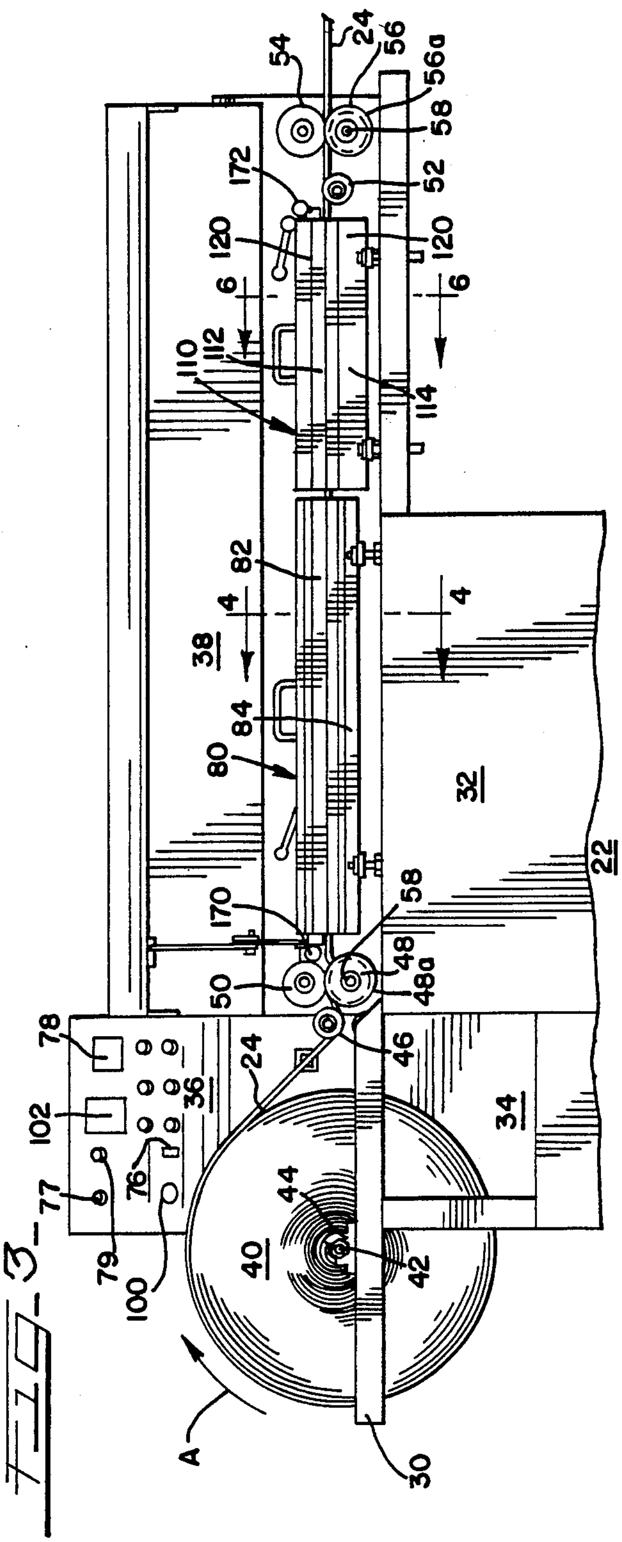
FIG. 3 is a front elevational view of the web forming apparatus of FIG. 2.

In accordance with the present invention, a length of web or stripping 24 which may be formed of standard polyvinylchloride or other suitable plastic material is supplied from a large coiled roll 40 carried on a free wheeling axle 42 supported on bearings 44 adjacent opposite faces of the roll as illustrated in FIGS. 2 and 3. As the strip of PVC webbing is unwound from the roll or supply coil 40, the roll and axle 42 can freely rotate in the direction of the arrow A and the PVC strip passes under a flanged alignment roller 46 before moving between the bite of a pair of drive and pressure rolls 48 and 50.

In an embodiment in accordance with the present invention, PVC material one inch wide and having a thickness ranging from 20 thousandths to 25 thousandths of an inch is initially supplied in a 500 foot continuous length forming a roll approximately two feet in diameter and weighing eighteen pounds. The roll 40 is carried on a one inch shaft which is supported for free wheeling unwinding action by the bearings 44 as the feed rolls 48 and 50 pull the material from the supply roll at a speed variable from 80 to 150 feet per minute. The free running idler roll 46 has flanges **46*a* on opposite sides and a groove in the middle approximately an inch and ⅛ wide to accommodate a one inch wide PVC strip 24. Feed rolls 48 and 50 are approximately four inches in diameter and 1½" wide with the driving roll 48 having flanges 48*a* on opposite sides and a groove approximately 1⅛" wide so that the surface of the upper pressure roll 50 can bear downwardly on the PVC strip 24 with a contact pressure of approximately 20 psi acting against the strip 24. Preferably, at least the roll 50 has a ½" thick rubber tire and has opposite side faces seated between the flanges 48*a* on the lower drive roll 48**.

At the opposite end of the table 30 there is provided a flanged exit idler roll 52 and a combination upper pressure roll 54 and lower flanged drive roll 56 having edge flanges **56*a* similarly to the edge flanges 48*a* of the entrance drive roll 48. Both sets of pressure and drive rolls are driven to move the PVC web or stripping 24 at exactly the same speed, and for this purpose, the lower drive rolls 48 and 56 are mounted on transverse drive shafts 58 projecting outwardly from the housing 34 at right angles underneath the path of the PVC strip. Suitable bearings are provided for supporting the transverse shafts 58 and each shaft is provided with a bevel gear 60 at an inner end for driving engagement with a bevel gear 62 on a common elongated drive shaft 64 (FIG. 2) running parallel of the PVC webbing 24 and contained within the housing section 38 as shown in FIG. 2. The drive shaft 64 is supported in a plurality of bearings 66 spaced longitudinally thereof and is driven through a chain and sprocket drive assembly 68 by a variable speed, electric gear motor 70**.

Figure 10:
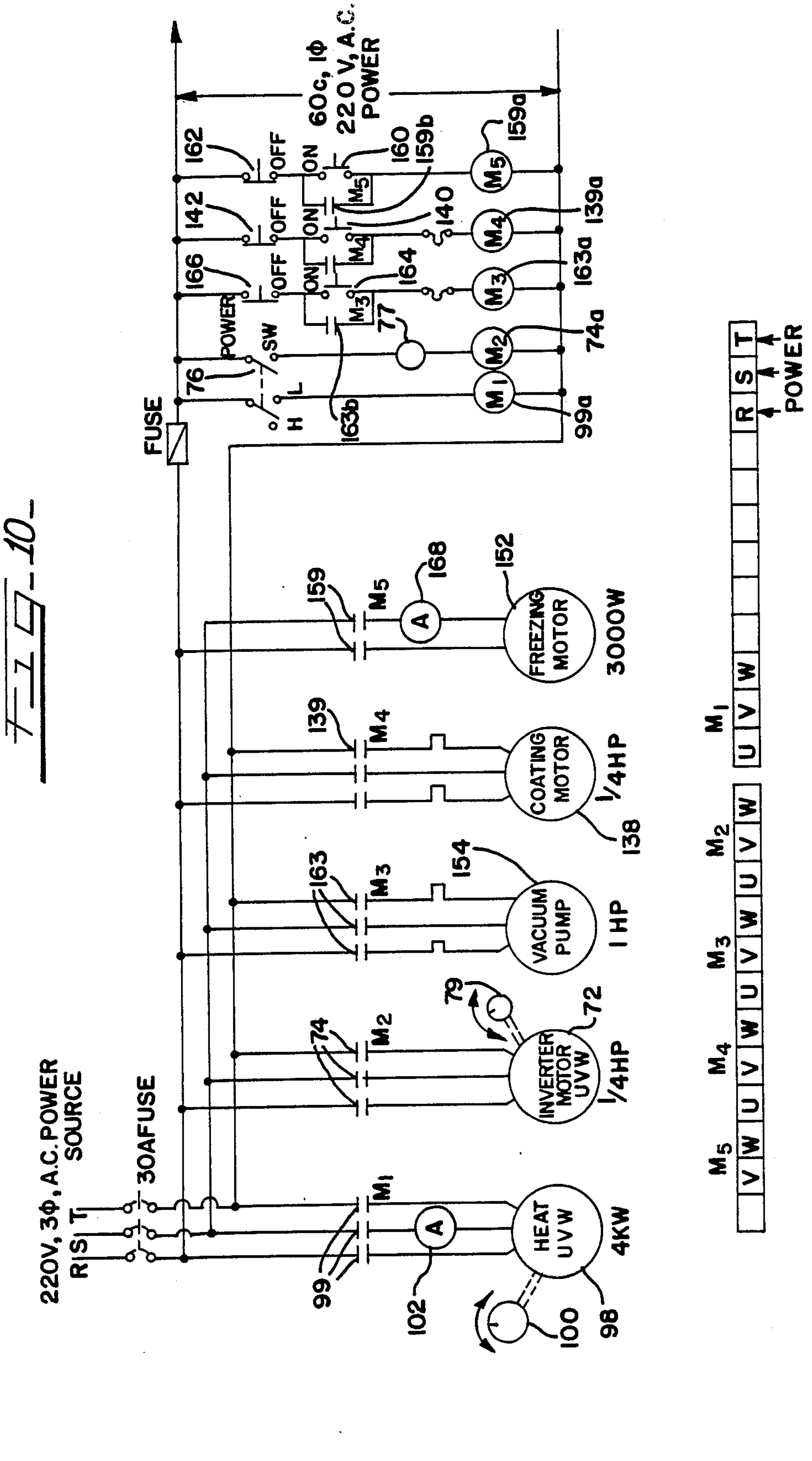
FIG. 10 is a schematic electrical diagram.

Referring briefly to FIG. 10, the variable speed gear motor 70 includes a variable speed DC-powered motor which is supplied with DC current of variable voltage from an inverter motor 72 which in turn is powered from a three-phase, 220 volt AC power source through a set of motor contactors 74 controlled by a solenoid winding **74*a* and a switch 76. A DC rheostat is provided for selectively controlling the amount of DC voltage supplied to the variable speed gear motor from the inverter motor 72**.

In accordance with the present invention, the lineal speed of the PVC webbing 24 passing through the system may be varied from approximately 80 feet per minute to 150 feet per minute by use of the DC rheostat (not shown) controlling the voltage supplied by the inverter motor 72 to the variable speed gear motor 70. The speed is adjusted as needed and is determined by the exit temperature of the PVC web 24 leaving the heating chamber of the apparatus. If the temperature becomes too high, the speed is increased and consequently the speed is decreased when the temperature becomes too low. An ideal temperature for the PVC strip 24 leaving the heating chamber is 117° C. plus or minus 10° C. This temperature range is just below the melting temperature of the material. When PVC material thicker than 20 to 25 thousandths of an inch is used a higher temperature may be required and the lineal speed of movement of the PVC strip 24 through the system may then be decreased toward the lower end of the 80–150 feet per minute speed range. A speed indicating meter 78 is provided on the control panel 36 so that a machine operator can adjust the speed of the PVC webbing 24 to obtain the desired temperature value. The speed of the drive rolls is adjustably controlled by a knob 79 on the control panel, which knob is mounted on a shaft of the DC rheostat (not shown) controlling the voltage output of the inverter.

In accordance with the present invention, the elongated PVC strip 24 is fed longitudinally thereof at a controlled speed rate selected by the knob 79 into an elongated heating chamber 80 wherein the temperature of the webbing is increased to facilitate subsequent molding into a curved transverse cross-section for use as slats in window blinds (FIG. 6). The elongated heating chamber 80 includes a pair of rectangular shaped, upper and lower heating sections 82 and 84 hingedly interconnected by a pair of hinge elements 86 attached to back edge surfaces of the elements at longitudinally spaced apart locations. The hinges are aligned with a common pivot axis between the respective upper and lower members extending longitudinally parallel of the path of travel of the moving web 24 through the heating chamber.

Figure 4:
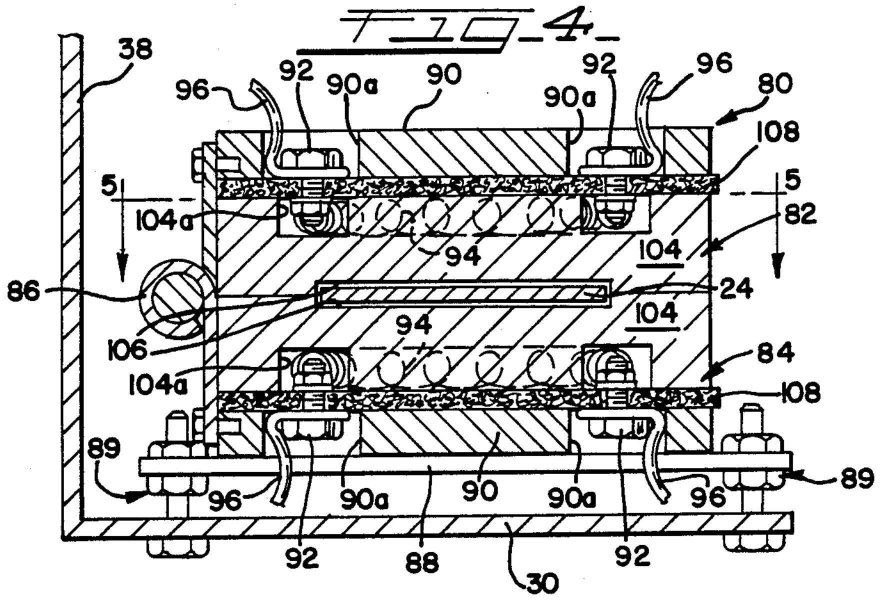
FIG. 4 is a transverse cross-sectional view taken substantially along lines 4—4 of FIG. 3.
Figure 5:
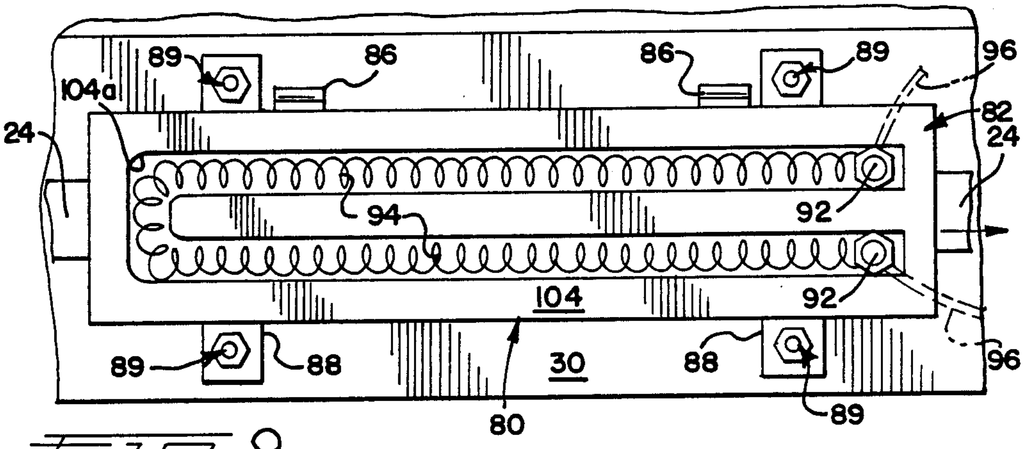
FIG. 5 is a cross-sectional view taken substantially along lines 5—5 of FIG. 4.
Figure 9:
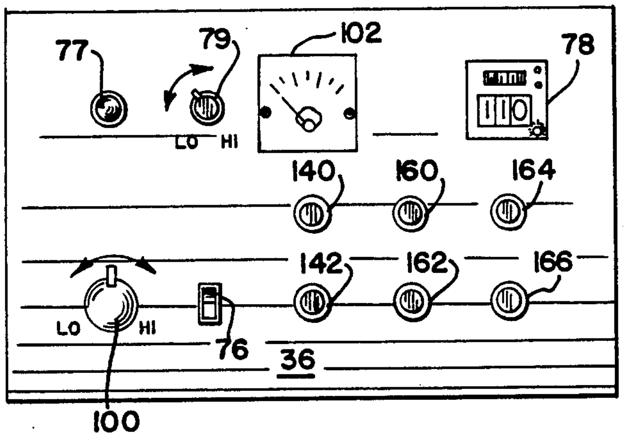
FIG. 9 is an enlarged elevational view of a control panel of the apparatus.

As best shown in FIGS. 4 and 5, the heating chamber 80 is supported from the upper table surface 30 on a plurality of transverse support members 88 and these support members are adjustable in height relative to the table surface on respective nut and bolt assemblies 89 so that the path of travel of the PVC web 24 may be precisely aligned with the level of the bite of the feed rolls 48 and 50 adjacent the entry side of the heat chamber.

The upper and lower heat sections 82 and 84 each includes a horizontal outer plate 90 formed with pairs of apertures 90a which are positioned adjacent the exit end of the chamber for accommodating pairs of electrical terminal post assemblies 92. The terminal posts are connected to supply electrical current to respective heating coils 94 mounted in the upper and lower heating sections 82 and 84. Current is supplied to the terminals 92 through flexible power leads 96 running from the output side of a DC inverter motor 98 (FIG. 10). This motor is supplied with three-phase 220 volt AC power through a set of contactors 99 controlled by a solenoid coil 99a. In order to vary the amount of heat supplied to the heat chamber 80 through the electrical resistance units 94, the DC output of the inverter motor is selectively controllable by means of a heat control knob 100 provided on the instrument panel 36 and an ammeter or gauge 102 is provided to enable an operator to selectively control the amount of heat supplied.

Referring to FIGS. 4 and 5, the electric heater coils 94 are mounted within U-shaped recesses 104a formed in respective upper and lower heating plates 104 having shallow longitudinally extending grooves 106, which grooves cooperate when the heating plates are closed as shown in FIG. 4 to define a thin, narrow heating path of generally rectangular transverse cross-section to accommodate the longitudinally moving PVC web 24. As illustrated in exaggerated form in FIG. 4, when the heating plates are closed together for heating operations, the shallow grooves closely confront one another and the opposite faces thereof are spaced apart by a distance slightly greater than the maximum thickness of the PVC webbing material 24 so that the material can slide freely in contact therewith without binding. The groove faces are highly polished and the grooves are dimensioned to be slightly wider than the width of the PVC strip 24 in order to preclude binding of the edges as the strip is moved longitudinally along the path defined by the shallow guideways or grooves 106. Each heating plate 104 is separated from a supporting outer backing plate 90 by means of a sheet of heat insulating and electrically insulating material 108 such as asbestos or an equivalent material so that even though the heating plates remain at an elevated temperature somewhat greater than the ideal temperature range of the PVC strip 24 of 117° C. plus or minus 10°, the outer backing plate 90 can remain at a suitable temperature to preclude someone from getting a severe burn if the plate is accidentally touched.

In a device constructed in accordance with the features of the present invention, the grooves 106 were constructed to be 1⅛" wide and 10 thousandths to 15 thousandths of an inch deep so that when the plates are closed together the path for the PVC strip 24 is 20 to 30 thousandths thick and accordingly, a PVC strip 1" in width and 20 to 25 thousandths of an inch in thickness can slide freely along the heating path formed by the confronting longitudinal groove faces.

Figure 7:
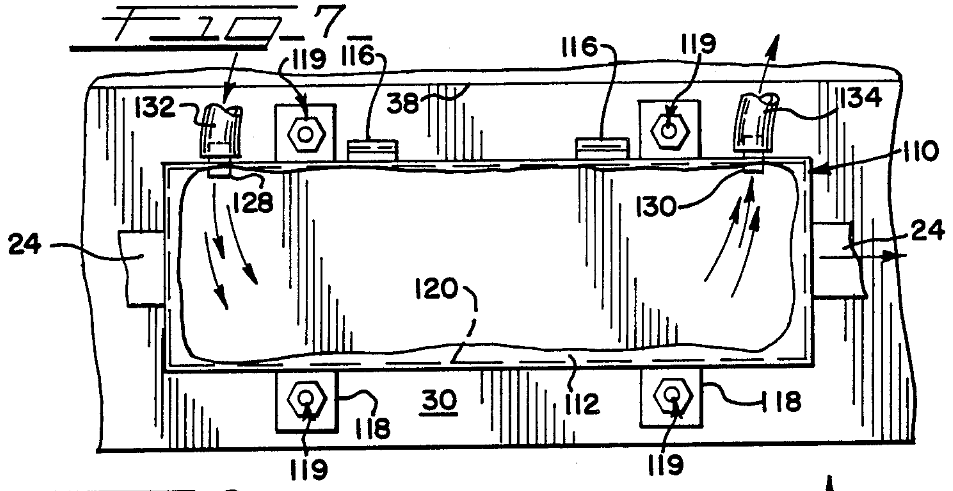
FIG. 7 is a cross-sectional view taken substantially along lines 7—7 of FIG. 6.

As the strip 24 leaves the exit end of the highly polished, faces of the grooves 106 which define the heating path, the strip reaches an elevated temperature of approximately 250° to 270° F. and this temperature is just below the melting point of the polyvinylchloride material or other material that may be used. Accordingly, the strip is flexible and ready for molding into the desired curved tranverse cross-sectional shape in a successive molding and cooling chamber 110 as shown in FIGS. 6 and 7. The heated PVC strip 24 moving longitudinally out of the exit end of the heat chamber 80 passes immediately into the entrance or inlet end of the molding and cooling chamber 110 as illustrated best in FIGS. 2 and 3.

The molding and cooling chamber 110 includes a pair of cooperative upper and lower sections 112 and 114 of generally rectangular, elongated shape which are hingedly interconnected by a pair of longitudinally spaced apart hinges 116. Each hinge has leaves secured to the backside edges of the respective upper and lower sections. The molding and cooling chamber 110 is supported from the table surface 30 on a plurality of transverse support plates 118, opposite ends of which are supported adjustably at the desired level on nut and bolt assemblies 119 as best illustrated in FIGS. 6 and 7. The adjustable support assemblies 119 permit the longitudinal path of the PVC webbing 24 moving through the chamber 110 to be accurately aligned and adjusted in coaxial relationship to the path of the PVC strip traveling through the heating chamber 80.

In accordance with the present invention the respective upper and lower cooling chamber sections 112 and 114 each include a hollow, box-like enclosure 120 adapted to contain and receive a circulating coolant fluid therein. Inner surfaces of the coolant chambers 120 are abutted against a pair of upper and lower die plates 122 and 144, each having a shallow groove 126 with a highly polished longitudinally extending, transversely curved face therein. These groove faces have precision ground, highly polished, shallowly curved (approximately 3" to 5" or greater in radius of curvature), confronting molding surfaces for molding the moving PVC strip 24 and thereafter setting the strip into a permanently curved transverse cross-sectional shape as shown in FIG. 6 when the strip leaves the cooling chamber 110 at approximately room temperature. The cooperating shallow grooves 126 of the molding and cooling die plates 122 and 124 have closely spaced apart, matching, confronting curved surfaces adapted to directly contact the moving PVC strip 24 and mold the same to the cross-section shown. As illustrated in FIG. 6, the face of the groove 126 in the lower die plate 124 is outwardly and upwardly convex transversely of the longitudinal axis of the groove and the face of the groove 126 in the upper die plate 122 is inwardly concave transversely of the longitudinal axis of the groove. A slight amount of clearance is provided between the surfaces of the grooves 126 and the moving PVC material passing through the chamber 110. The precise amount of the radius of transverse curvature is chosen and dependent on the thickness and stiffness of the PVC material 24 at normal room temperature (60° F. to 80° F.) and may range between 3" and 5", preferably about 5" when the strip of PVC material 24 is 0.020" to 0.025" thick and 1" wide.

Refrigerated coolant fluid is circulated through the interior of the upper and lower hollow cooling chambers 120 through inlets 128 adjacent the inlet end of the cooling and molding chamber 110. This fluid moves through the chambers generally in the same direction as the longitudinally moving PVC webbing 24 so that the hot webbing is exposed to the coldest fluid at the entry end and is rapidly cooled and molded into the curved cross-section as shown to achieve a permanent set by the time the strip or webbing leaves the exit end of the longitudinal path defined by the shallow die grooves 126 in the respective upper and lower cooling die plates 122 and 124.

As the coolant fluid picks up heat from the previously heated PVC webbing 24 to reduce the temperature thereof for providing a permanent set thereto with the curved cross-section as shown, the temperature of the coolant begins to rise and reaches a maximum adjacent an exit nozzle 130 at the exit end of the respective cooling chamber 120. At this point, a substantial amount of heat has been removed from the continuously moving PVC web which is now permanently set with a curved transverse cross-section (FIG. 6). The exit temperature of the molded PVC strip 24 leaving the cooling chamber is maintained at approximately room temperature and in the range of 60° F. to 80° F.

Figure 8:
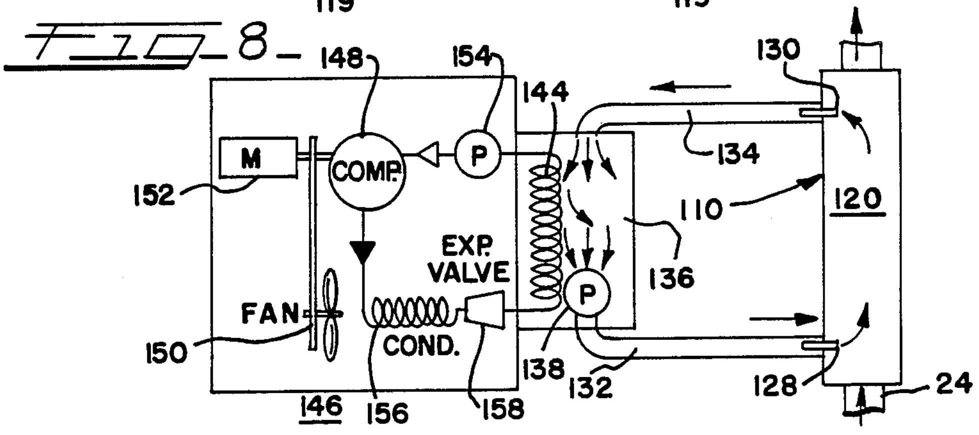
FIG. 8 is a schematic diagram illustrating a refrigeration system used in accordance with the present invention for cooling the setting mold of FIGS. 6 and 7.

Referring specifically to the schematic diagram of FIGS. 7 and 8, pairs of flexible supply and exhaust hoses 132 and 134, respectively, are interconnected between the respective upper and lower cooling chambers 120 and a relatively large size reservoir 136 holding a supply of coolant liquid therein and provided with a circulating pump designed to draw fluid from the reservoir and pump it into the coolant supply lines 132 for circulation through the coolant chambers 120 as described. A coolant pump motor 138 is energized through a set of contactors 139 (FIG. 10) and a solenoid winding **139*a* controlled by stop and start pushbuttons 140 and 142, respectively, provided on the control panel 36 and shown schematically in the diagram of FIG. 10. A pair of holding contacts 139*b* are provided for maintaining the solenoid 139*a* in an energized state after the starting pushbutton 140 has been momentarily pushed and released. In order to stop the coolant pump motor 138, the off pushbutton 142 is depressed and the holding contacts 139*b*** then return to the normally open position as illustrated.

In accordance with the present invention, the cooling liquid is refrigerated by means of a refrigeration coil 144 in the cooling liquid reservoir 136 and a refrigerant such as "Freon" or the like is provided for circulation and expansion in the refrigerant coil 144 in a conventional manner. Referring specifically to FIGS. 8 and 10, a refrigeration system 146 includes a compressor 148, fan 150, drive motor 152 and vacuum pump and drive motor 154 therefor. Refrigerant from the high pressure side of the compressor flows into a fan-cooled condenser 156 and then passes through a temperature adjustable thermostatically controlled thermal expansion valve 158 which is connected to the refrigerant coil 144 in the liquid reservoir 136. Controlled circulation of refrigerant back to the compressor 148 is provided by the vacuum pump and drive motor 154 in a conventional manner.

The compressor drive motor 152 is energized through a pair of contacts 159 controlled by a coil **159*a*, a start pushbutton 160 on the control panel, and a stop pushbutton 162 therebelow. Holding contacts 159*b* are provided for maintaining the coil 159 in an energized state to close the contacts 159 after the momentary start pushbutton 160 is pushed and released. Similarly the vacuum pump drive motor 154 is controlled through a set of contacts 163 held in the closed position by a coil 163*a* and controlled by a momentary start pushbutton 164, holding contacts 163*b* and a stop pushbutton 166. An ammeter 168 is provided in the power lines running to the compressor motor 152 in order to monitor the overall operation of the refrigeration system 146**.

When the PVC web or strip 24 exits from the exit end of the cooling chamber 110, a permanent set is provided therein as illustrated by curved transverse cross-section as shown in FIG. 6. The continuous webbing then moves into the cutting and punching section 26 and after cutting and punching to the desired length, the slats are assembled with flexible cord ladders in the final assembly section 28 to form finished window blinds.

FIG. 11 represents an electrical circuit diagram for the cutting and punching section 26 and final assembly section 28 and reference should be had to the aforementioned copending parent application for a more detailed description of the operation and function of the disclosed apparatus in these cutting and punching and final assembly sections 26 and 28. The exit feed rolls 54 and 56 provide a longitudinal thrust to feed the relatively stiff, PVC webbing 24 into the cutting and punching section 26.

In accordance with a feature of the present invention, the heat chamber 80 and the molding and cooling chamber 110 are provided with handles 170 and 172, respectively, at opposite ends. The upper heating chamber section 82 can be opened by pivoting upwardly to expose the interior faces of the upper and lower heating plates 104 and the grooves 106 therein which define the travel path of the PVC webbing. Similarly, the control lever and knob 172 is provided at the exit end of the molding and cooling chamber 110 so that the upper chamber section 112 can be pivoted to an open position to expose the inner faces of the molding and cooling dies 122 and 124 and the faces of the shallow grooves 126 which form the molding surfaces for guiding and forming the PVC strip 24 into a curved transverse cross-section as shown. In the event a length of PVC strip or webbing sticks or wedges within the grooves or recesses 106 or 126 of the heating chamber 80 and/or molding and cooling chamber 110, the upper and lower plates of the respective heating and cooling chambers can be pivoted apart to provide immediate and fast access in order to clear out the strip and continue the process with minimal delay and loss.

As set forth herein, the apparatus 22 in accordance with the present invention is designed to move the flat PVC strip or webbing 24 from a supply roll 40 through the heating chamber 80 and into the molding and cooling chamber 110 to provide a permanent, curved cross-section as shown. The strip then passes into the cutting and punching section 26 for cutting the continuous strip into slats of a selected length and punching openings therein as needed for eventual assembly into finished window blinds in the final assembly section 28.

The speed of movement of the PVC strip 24 is adjustably controllable from 80 to approximately 150 feet per minute by the variable speed drive system as described and the temperature level of heating and cooling may be accurately controlled to provide a high quality product. PVC material of different widths and thicknesses may be handled easily by replacement of the heating and cooling plates with plates having grooves of appropriate dimensions. The heating temperature as well as cooling temperatures may be precisely controlled to make sure that the proper amount of curvature and permanent or set is provided. Preferably, the PVC strip 24 heated to a temperature level just below the melting point of the material as it exits from the heating chamber 80 and is then cooled and molded into a permanent curved-set before leaving the cooling chamber 110 at approximately room temperature (60° F. to 80° F.) to pass through the exit rolls 54 and 56 into the cutting and punching section 26.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. A method of forming slats for window blinds and the like from a continuous web of plastic material, comprising the steps of:

feeding said web from a roll thereof at a selected feed rate into a heating chamber;

heating a flat traveling segment of said web while moving longitudinally thereof through said heating chamber to a selected elevated temperature level ready for molding;

molding said heated web to form a curved transverse cross-section while cooling to a selected cooling temperature while traveling longitudinally through a cooling chamber to mold and permanently set said web into said curved transverse cross-section; and thereafter cutting said cooled and molded web into slats of discrete length and punching openings therein ready for receiving flexible support elements to form said blinds.

2. The method of claim 1 wherein said flat traveling segment of said web is heated to 117° C. ±10° C. while passing through said heating chamber.

3. The method of claim 1 wherein said heating chamber defines a heated travel path for said flat traveling segment of said web and wherein opposite surfaces of said segment are moved in close proximity to flat heated surfaces defining said travel path.

4. The method of claim 3 wherein said opposite surfaces of said traveling segment of said web are spaced within 0.005" of said flat heated surfaces.

5. The method of claim 2 wherein said web is formed of polyvinylchloride.

6. The method of claim 5 wherein said web has a thickness ranging between 0.020" and 0.025".

7. The method of claim 1 wherein said flat traveling segment of said web is raised a temperature level just below the melting point of said plastic material as said web leaves said heating chamber.

8. The method of claim 1 wherein said web is cooled to substantially room temperature as said web leaves said cooling chamber.

9. The method of claim 8 wherein said web is molded to have a transverse radius of curvature of approximately 2" to 5" permanently set therein upon leaving said cooling chamber.

10. Apparatus for making slats for window blinds and the like from a continuous web of plastic material, comprising:

feed roll means for directing said web from a supply roll in a longitudinal direction at selected feed rate into a heating chamber;

a heating chamber having upper and lower plates each having a longitudinal groove for defining a heating path for the longitudinal travel of a flat section of said continuous web between inlet and exit ends of said heating chamber, said grooves having heated, confronting, matching, opposite heating surfaces for heating contact with opposite sides of said traveling web moving adjacent thereof;

a cooling and molding chamber having an inlet end closely adjacent the exit end of said heating chamber and having upper and lower molding and cooling dies defining a longitudinal cooling and molding path for permanently molding and setting said web into a curved transverse cross-section, while a section of said web is traveling longitudinally toward an exit end of said cooling and molding chamber; and exit feed roll means for directing said web exiting from said cooling and molding chamber longitudinally towards a cutting and punching section for cutting said web into slats of discrete length and punching openings therein ready for receiving flexible support elements to complete the formation of blinds from said slats at a final assembly section.

11. The apparatus of claim 10, wherein;

said heating chamber includes a pair of upper and lower heating elements secured to heat said upper and lower plates; and hinge means for interconnecting said plates to pivot about an axis longitudinally parallel of said heating path between an open position, wherein said grooves are accessible from the exterior and a closed position wherein said grooves confront each other to define said heating path.

12. The apparatus of claim 11, wherein;

said surfaces of said grooves are spaced apart by a distance slightly greater than the thickness of said web passing through said path with said plates in said closed position.

13. The apparatus of claim 12, wherein;

said groove surfaces are highly polished and flat to provide smooth confronting contact with opposite surfaces of said flat section of said web moving through said heated path.

14. The apparatus of claim 10, wherein;

said cooling and molding chamber includes a pair of hollow cooling chambers associated with each of said upper and lower cooling and molding dies for cooling the same to reduce the temperature of said web section moving through said longitudinal molding and cooling path; and refrigerant means for directing a coolant fluid into and out of said cooling chambers to cool said dies.

15. The apparatus of claim 14, wherein:

said cooling and molding path is defined by longitudinally extending, confronting die grooves formed in adjacent faces of said upper and lower molding and cooling dies, said die grooves having spaced apart die molding surfaces curved transversely of said molding and cooling path for engaging opposite surfaces of said section of said web to curvingly mold and set the same into said curved transverse cross-section.

16. The apparatus of claim 15, wherein:

said upper and lower molding and cooling dies are hingedly interconnected to pivot about an axis parallel of said longitudinal molding and cooling path between an open position exposing said die grooves and a closed position wherein said die groove surfaces are in closely confronting relation to mold and cool said web moving closely adjacent thereby.

17. The apparatus of claim 16, wherein;

said closely confronting die groove surfaces are spaced apart by a dimension slightly greater than the thickness of said web passing thereby when said dies are in said closed position.

18. The apparatus of claim 16, wherein;

one of said die groove surfaces is convexly curved in transverse cross-section and the other confronting die groove surface is concavely curved in transverse cross-section.

19. The apparatus of claim 10, including:

means for adjustably controlling said feed roll means to move said web longitudinally at a selected speed rate.

20. The apparatus of claim 10, including;

means for adjustably controlling the temperature of said groove surfaces in said heating chamber and said die groove surfaces in said molding and cooling chambers.

* * * * *